June 27, 1944.    G. KENDE ET AL    2,352,551
METHOD OF FORMING OPTICAL PRISMS
Filed March 2, 1942    7 Sheets-Sheet 3

BEFORE 1ST OPERATION
AFTER 1ST OPERATION
AFTER 2ND OPERATION
AFTER 3d OPERATION

Fig. 8

BOTH ENDS FINISHED

INVENTORS
BY
ATTORNEY

June 27, 1944.  G. KENDE ET AL  2,352,551
METHOD OF FORMING OPTICAL PRISMS
Filed March 2, 1942  7 Sheets-Sheet 4

June 27, 1944.　　G. KENDE ET AL　　2,352,551
METHOD OF FORMING OPTICAL PRISMS
Filed March 2, 1942　　7 Sheets-Sheet 5

June 27, 1944.  G. KENDE ET AL  2,352,551
METHOD OF FORMING OPTICAL PRISMS
Filed March 2, 1942  7 Sheets-Sheet 6

BEFORE 1ST OPERATION
AFTER 1ST OPERATION
AFTER 2ND OPERATION
AFTER 3D OPERATION

INVENTORS
BY
ATTORNEY

Patented June 27, 1944

2,352,551

UNITED STATES PATENT OFFICE 2,352,551

METHOD OF FORMING OPTICAL PRISMS

George Kende, Dobbs Ferry, and Eli Elison and Sten Johanson, New York, N. Y., assignors to Universal Camera Corporation, New York, N. Y., a corporation of New York Application March 2, 1942, Serial No. 432,944

12 Claims. (Cl. 51—118)

This invention relates generally to the processing of frangible material and is more particularly directed to a method and apparatus for grinding molded or otherwise formed glass units in the production of optical devices, as prisms and the like.

In the manufacture of optical prisms, for instance, it is now the general practice to cast or mold the glass in the appropriate prismatic forms and in oversize dimensions, the molded units then being individually reduced to the requisite final size and contours in a series of hand-performed grinding operations. At best, this is a slow and tedious process, requiring the exercise of a considerable degree of skill on the part of those doing the work, to insure accuracy of dimensioning and especially in producing such specific contours as may be essential to the purposes to which the completed units are to be applied. Obviously, these hand grinding methods not only limit the rate of production, but result in an appreciable waste or spoilage of material, because of improper manipulation of handling of the units during some stage of the grinding process, all of which, of course, contribute to the high manufacturing costs and retard production of apparatus of which such optical units are to become essential components.

Therefore, the primary object of this invention is to provide a method of overcoming the disadvantages inherent to the present hand grinding operations, referred to, in the production of optical devices, as prisms and the like, by utilizing automatically functioning mechanisms for doing the work now performed by hand, thereby not only eliminating the drawbacks, economically and otherwise, of slow production, but insuring uniform accuracy in dimensioning and profiling the units, for their subsequent completion by polishing, which is not attainable with existing methods, waste or spoilage by breakage or inexact grinding, being thus reduced to an absolute minimum.

More specifically, it is the object of this invention to provide a simple and efficient mechanism for progressively processing, as by grinding, a series of units by the automatic functioning of the mechanism, the dimensioning of the units and the profiling or contour-forming operations being accomplished in successive steps or stages, in the practicing of my method.

It is also an object of our invention to provide an apparatus or mechanism, as aforesaid, which will possess a range of adjustability, whereby units of different sizes may be processed and which will also insure the maximum amount of service that may be obtainable from a grinding element, before it is necessary to replace it, thereby adding to the economic advantages of our invention.

Another important object of our invention is the provision of a mechanism or apparatus, possessing the heretofore recited advantageous features, which will admit of further accelerated production by rendering it possible to perform certain similar operations simultaneously, as, for example, reducing the cross-sectional area of a unit, by removing material from the opposite sides thereof by the conjoint functioning of associated grinding media or elements.

Other objects and advantages flowing from the practicing of our invention will become evident as the description proceeds and we would have it clearly understood that we reserve unto ourselves all rights to the full range of equivalents of the steps of our method and the apparatus whereby they may be carried into effect, within the scope of the appended claims.

Briefly stated, our invention contemplates an apparatus or mechanism for practicing our method of processing optical devices in an expeditious and efficient manner, which, preferably, includes three steps, the reduction of the rough prismatic casting to the requisite cross-sectional dimensions, by simultaneously subjecting both sides thereof to the action of mated grinding elements, being followed by grinding the ends of the unit in successive similar operations, to impart the desired contour thereto, arcuate or otherwise, as may be necessary for the purposes to which the completed unit is to be applied, after which the roof or apex is ground to obtain the required height and profile, the sequence of these steps, of course, being subject to change to meet operational and other requirements.

In the operation of the mechanism or apparatus, for the performance of each of the aforesaid several steps, a revoluble work carrier to which the unit may be manually applied, to be sequentially automatically locked in position thereon during an initial period of its rotative movement, successively exposes the units clamped thereto to the action of a series of grinding elements successively effective on each unit, in a continuing movement of the carrier, the units, as they progress from the final grinding operation of the step of the method then being performed, being automatically released for removal from the revolving carrier. The mechanism may be operated continuously at a predetermined speed, over long periods of time and during such operation, optical units that are to be subjected to a specific grinding step may be entered upon a carrier in replacement of those which are removed therefrom, following the completion of such grinding step, with the obvious elimination of those production lags which must inevitably result from machine stoppages and the locating of the work therein.

In other words, by utilizing my method and apparatus or mechanism, functioning in the manner described, for rendering our invention effective, so-called setting-up or preparation of the work in the apparatus is wholly unnecessary, the units being readily locatable upon the carrier in defined positions, the subsequent progressive work-clamping and grinding operations and the release of the work on the completion of the final grinding stage being entirely automatic. Manifestly, not only is continuity of production possible, but the economic advantages thereof may be attained with the use of unskilled labor, the mechanism being so designed that a battery of machines may be efficiently supervised and the work applied to and removed from the individual mechanisms thereof by a single operator.

In the accompanying drawings, we have shown a preferred and practical embodiment of apparatus for carrying our invention into effect.. However, the apparatus may take other forms, with such structural variations or substitutions as may be essential to particular applications or uses, in the practicing of our method, without departing from the spirit and scope of our invention.

In the following detailed description of the construction and operation of the apparatus shown, I shall refer to three separate and distinct steps, which will be described in the order in which they are preferably performed, in the functioning of the apparatus. The first of these, is that in which both sides of a prism are simultaneously ground or reduced. The second is an end processing step, involving two similar phases, preferably successively performed, in which the ends of a prism are given the required identical contour, and the third and final step is the prism roof-forming operation. If desired, or found necessary, the sequence of the steps may be varied, as heretofore pointed out; also, the contours produced may differ from those shown, as a result of profiling steps, in the production of prisms and other optical devices, it being understood that the term prism is used in a generic sense, to include all such optical devices as may be produced in accordance with my invention.

Figure 1:
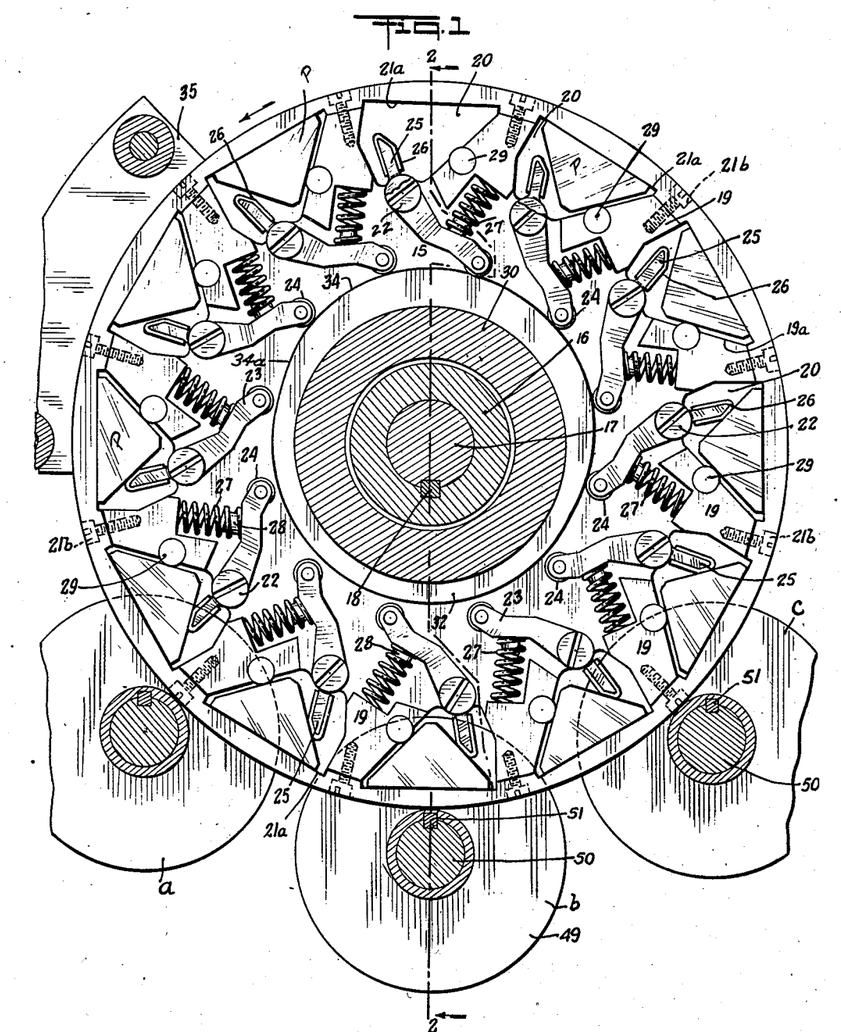
Figure 1 is a view in elevation (taken from the left of Figure 2) partly in section, of the revoluble work-carrier and associated grinding elements, that is utilized to reduce the cross-sectional dimensions of a prism, by simultaneously removing material from each of the opposite sides thereof.
Figure 2:
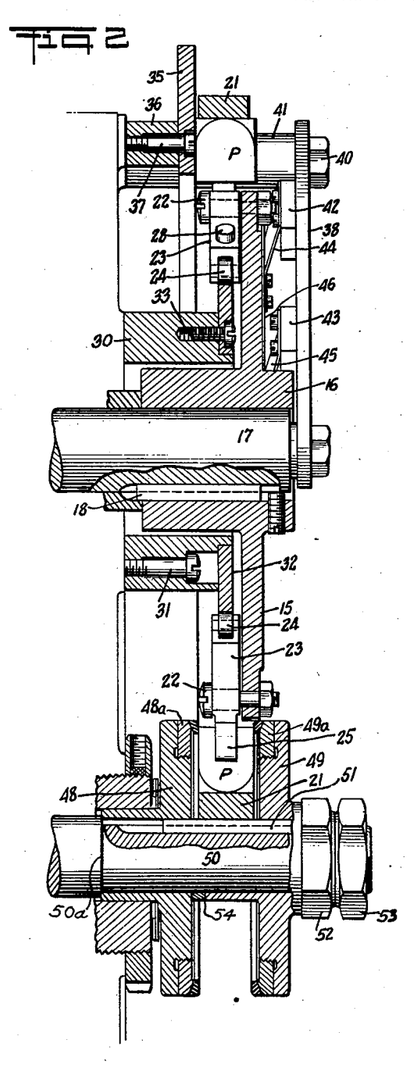
Figure 2 is a vertical cross-section on the line 2—2 of Figure 1.

Referring now to the drawings in detail, in which like characters of reference are employed to designate similar parts in the several views, and more particularly to the mechanism for simultaneously reducing both side faces of a prism, as shown in Figures 1 and 2, a work-carrier in the form of a disc-wheel 15, embodying a hub 16, is keyed to a shaft 17, as at 18, for rotation at slow speed, in a counter-clockwise direction, as and for the purposes which will be hereinafter more fully described.

The inner face of the wheel 15 is provided with a series of preferably integral laterally projecting bosses, of the configuration shown in Figure 1, equidistantly spaced along its periphery which is recessed or undercut between adjacent bosses, as at 20, whereby said bosses, in conjunction with the rim or flange 21 cooperate in the formation of a series of work-receiving seats, said rim or flange which is offset relatively to the body of the wheel, being fixed to the periphery thereof, between the aforesaid recessed portions 20, as by the screws 21b. Each boss embodies an obliquely disposed surface 19a complemental to the end face of a prism, which constitutes one side of a work-receiving seat, while the inner surface of the rim 21, in the area of the recesses 20, is undercut, as at 21a, to provide a surface complemental to a prism base. The width of the cooperating seat-defining surfaces 19a and 21a, is less than the transverse dimensions of the prisms that are to be processed, so that a prism located in a seat for processing, with its base superimposed upon the surface 21a, will project outwardly of the seat, at both sides thereof, whereby simultaneous reduction of the two side faces of the prism may be effected as hereinafter explained.

Rockably mounted on a bolt or stud 22, adjacent each work-forming seat, is a lever 23, bifurcated at one end, for the reception of a cam roller 24, the opposite end of said lever terminating in a nose 25, shaped to provide a surface complemental to a part of the end face of a prism, with which it is adapted to engage, in the manner hereinafter set forth, the nose, preferably, being enveloped in, or coated with, conforming fibrous or yieldable material, as indicated at 26. An expansion spring 27, interposed between a seat 28 on said lever, adjacent the cam roller 24, and a cooperating seat formed on the contiguous boss 19, normally functions to urge the nose of said lever toward the opposite surface 19a of such boss, with which a fiber plug 29 is associated, in a manner to permit a portion of its periphery to protrude beyond said surface.

The aforesaid hub 16 of the work-carrier, is freely rotatable within a concentric annulus or collar 30, bolted to the apparatus frame, as at 31, the outer end of said collar being shouldered for the reception of a ring 32, fixed thereto, as by screws 33. This ring embodies a cam surface 34, which is adapted to be traversed by the cam rollers 24 of the respective levers, during a part of the cycle of the relative rotative movement of the work-carrier, to progressively actuate the levers 23 to one extreme position, in opposition to their springs 27 and to similarly control the spring-induced movement of said levers in a reverse direction, from such initial extreme position, to a second extreme position.

As clearly shown in Figure 1 of the drawings, the cam 34 is laid out in an arc of 180° upon the upper portion of the ring 32, extending from a point 22½° below a horizontal line drawn through the center of the shaft 17 to a point the same distance above such line on the opposite side, the pitch or curvature of the effective surface thereof, providing for a progressive movement of the levers in opposition to their springs 27, as the cam rollers successively enter upon and traverse the cam to ride upon an intermediate portion of the surface thereof, indicated at 34a, when they become inactive. The nose portions of the levers in this inactive position, are so disposed within the areas of the recesses, that prisms may be readily inserted in the seats with which such levers are associated, from the side of the work-carrier, each prism being located with its base in registration with the rim surface 21a and one end abutting upon the adjacent fiber plug 29. As the work-carrier continues its rotative movement, in the direction of the arrow, and the cam rollers successively leave the portion 34a of the cam surface, the gradually diminishing pitch of the cam surface permits their springs 27 to gradually expand to cause the nose portion of each lever to make contact with the juxtaposed end of the prism and exert progressively increasing pressure thereon, to urge it into close association with the opposed plug 29, and into positive engagement with the coacting rim surface 21a, the prism being rigidly locked in this final position in response to the counter pressure of the plug and lever nose 25, effective thereon, as the cam roller leaves the cam surface. Obviously, this cycle may be continued indefinitely, as the prisms, firmly clamped within the seats progress through the grinding stages of the operation, as hereinafter described, and are successively advanced to the positions in which the clamping elements become ineffective, so that they may be removed from their seats, the slow speed at which the carrier rotates making it possible for the operator to remove the processed prisms and substitute others for grinding, without arresting the movement of the work-carrier.

As the prisms advance to the zone in which clamping effort is initiated thereon by the movement of the levers in response to the expansion of their springs 27, they are accurately centered longitudinally of their seats, as their projecting sides pass between a fixed guide plate and an oppositely spaced cooperating spring means, effective laterally of the prisms, to urge them into riding contact with said guide plate. The semi-annular guide plate 35, fixed to the frame of the apparatus, inwardly of the work-carrier, as by the spacers and cooperating screws 36 and 37, also functions as a locator, in limiting the inward movement of the prisms, as they are inserted in their seats from the opposite side of the work-carrier, while the aforesaid spring means are carried by an arcuate plate 38 which is likewise secured to the frame of the apparatus by suitable bolts and spacers 40 and 41, parallel to that portion of said plate 35 which lies within the aforesaid zone, in laterally spaced relation thereto. Mounted on the inner face of the plate 38 are a pair of spring blocks 42 and 43, to which the springs 44 and 45, having inclined intermediate portions, are secured, the free ends of said springs being connected by a flexible surface 46, which is adapted to contact with the adjacent side faces of the prisms, as they progress thereby, the spring action permitting the flexible surface to engage an advancing prism that may be out of line and urge it into position, as the prism progresses toward the position in which the clamping action, as heretofore described, is completed.

Mounted below the work-carrier are a series of grinding elements, arranged in pairs, each pair, functioning as a unit, being peripherally spaced from the adjacent pair, their axes of rotation being located on a curvilinear line, parallel to the orbit of rotation of said work-carrier, the prisms clamped in said work-carrier successively passing between the spaced sets of grinding elements, indicated at a, b and c, to expose their protruding side portions to the abrading action thereof, for progressively reducing the transverse area of the prisms.

As shown in Figure 2, each pair or set of grinding elements includes an inner and outer grinding ring wheel 48 and 49, carrying the grinding rings 48a and 49a, which are keyed to a shaft 50, by a common key, as at 51, in the appropriate laterally spaced relation, and locked against a shoulder 50a of the shaft and against longitudinal movement, by the nuts 52 and 53, the shaft 50 being mounted in the frame of the apparatus parallel to the shaft 17, in adjustable bearings and being driven in the manner hereinafter described. While the grinding element mounting as just described, refers to the structure of Figure 2, in detail, showing the second spindle assembly, it will suffice for all three, since the assembly is identical, except for the difference in spacing of the grinding elements, which is attained by inserting spacers, as indicated at 54 in Figure 2, of different degrees of thickness between the opposed wheels, it being apparent that the spacer is positioned upon the shaft 50 in contact with the side of the inner wheel after which the outer wheel is located on the shaft with its hub abutting upon the adjacent surface of the spacer and the assembly locked to the shaft by the nuts, as aforesaid.

From the foregoing, it will be evident that as the work-carrier rotates, the projecting portions of the prisms locked thereto, will enter between the set of grinding elements *a* of the first spindle assembly for the simultaneous reduction of both sides of the prism, as their progression is continued, in the amount determined by the relative spacing of the grinding elements, and that in succession, the prism will be subjected to the abrading action of the remaining sets of grinding elements *b* and *c*, in a like manner, the amount of reduction being in decreasing amount at each successive stage, until the progressive reduction operation is completed, the movement of the prisms continuing to that part in the rotation of the work-carrier, where they may be removed from their seats and others substituted for the reduction of their side surfaces.

Figure 3:
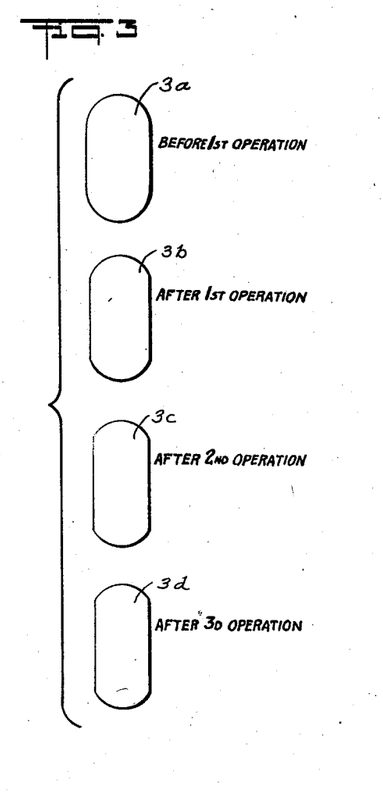
Figure 3 is an assembled diagrammatic view, showing a prismatic casting and the degree of reduction that is produced in its transverse area, in the functioning of the grinding elements of the preceding figures.

In Figure 3, view 3*a* shows the approximate cross-sectional dimensions and plan of a molded prism base, in the condition in which it is applied to the work-carrier, while view 3*b* illustrates the reduction that is effected, with the resulting change in outline, in the first stage of the side-reducing operation, the progressive reduction in the second and third or final stages being shown in views 3*c* and 3*d* respectively.

Figure 4:
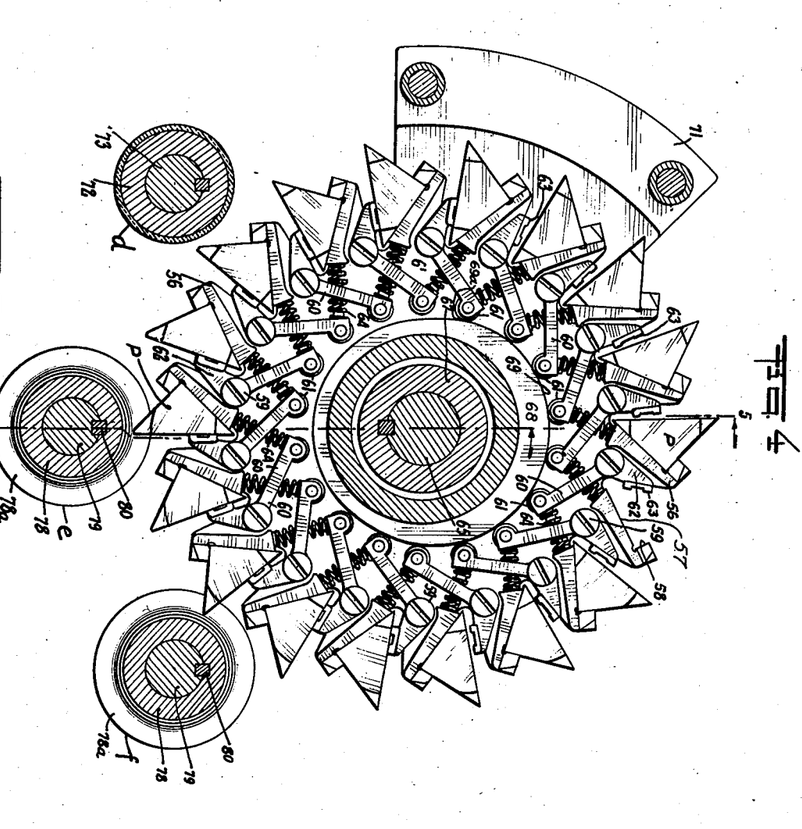
Figure 4 is a view similar to Figure 1, of the form of work-carrier and cooperating grinding media, that is employed in the performance of the two corresponding phases of the second step of our method, whereby the ends of the prism are ground to the desired contour.
Figure 5:
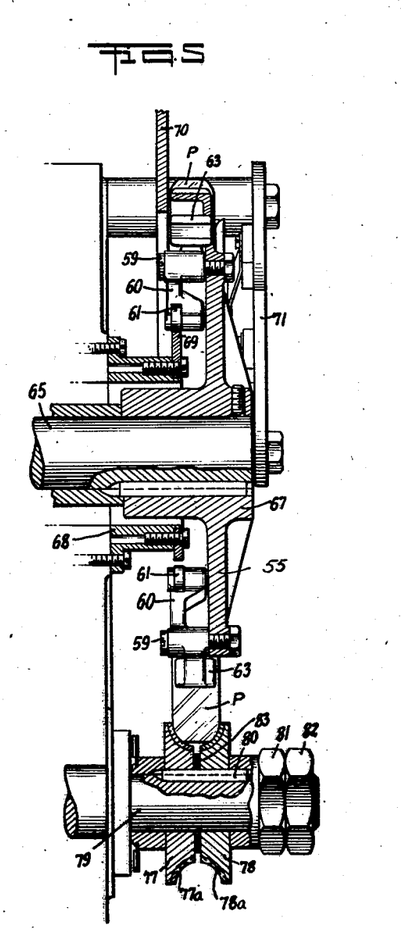
Figure 5 is a vertical transverse section on the line 5—5 of Figure 4.
Figure 6:
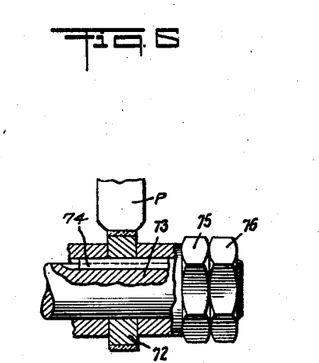
Figure 6 is a cross-section of the grinding element to the action of which the prism is first subjected in the functioning of the end grinding mechanism shown in Figures 4 and 5.

In the mechanism shown in Figures 4 to 6, inclusive, which functions in the reduction and profiling of the ends of a prism, in similar, and preferably, succeeding steps, the work-carrier comprises a disc-wheel 55, embodying laterally projecting seat-forming bosses 56, equidistantly spaced along the periphery of said wheel. Each of these bosses is provided with two work-engaging surfaces, the surface 57 being slightly shorter than the length of the end face of a prism P matable therewith, while the shorter surface 58, disposed at an angle of 90° to the surface 57, at the outer terminus of the latter, is adapted to engage the opposite end face of the prism, in a zone adjacent the prism apex. As will be noted from Figure 4, the bosses 56 are relatively angularly offset, so that the surface 57 of each thereof will be disposed to locate the base of a prism parallel to a radial line through the axis of rotation of the work-carrier, when one end face of such prism is in registration with said surface, with a portion of its opposite end face abutting upon the surface 58, for reasons which will become apparent.

Rockably mounted on a screw 59, on each boss 56, behind the surface 57 thereof, is a bell-crank lever, the inner end of the arm 60 of which is bifurcated to carry a cam roller 61, while the outer and shorter arm 62 of said lever is provided with a surface disposed parallel to one side thereof, as indicated at 63, which embodies a central undercut portion, formed for engagement with the base of a prism engaged with the aforesaid seat-defining surfaces 57 and 58, as described. An expansion spring 64, interposed between the end of the arm 60 carrying the cam roller 61, and a suitable seat formed on the aligned base of the immediately adjacent boss, normally tends to urge the shorter arm toward the prism seat-defining surface 57.

The wheel 55 is keyed to a shaft 65 and embodies a hub 67, rotatable within the annulus 68, which includes a cam surface 69, disposed similarly to the cam surface 34 on the ring 32 of Figure 1, the length of the effective surface of the cam surface 69 being greater however, and its curvature or pitch differing to an extent to provide for the increased number of clamping elements and the progressive actuation of the bell-crank levers to their prism-releasing positions, as their cam rollers 61 enter upon and traverse the cam surface, to ride upon the intermediate portion 69*a* thereof, corresponding generally to the similar portion 34*a* of the cam 34, during which static period of the levers, the prisms may be inserted in and removed from the work-carrier seats. Likewise, the movement of the bell-crank levers, under the influence of their springs 64, is progressively controlled by the cam surface, as the cam rollers 61 leave the portion 69*a* thereof, for the initiation of the spring-induced movement of the bell-cranks and its completion, as the cam rollers exit from the cam surface 69.

Also, as in the mechanism for reducing the sides of the prism, the prisms seated in the co-operating surfaces 57 and 58 of the work-carrier 55, pass between a fixed inner prism guide 70 and a yieldable outer guide 71, which corresponds structurally and in their mode of functioning, to the counterparts of the side-reducing mechanism, previously described.

Mounted below the work-carrier 55 are a plurality of grinding elements, which include a single grinding wheel and two sets of paired grinding wheels, the mated wheels of each set functioning as a unit simultaneously to reduce and shape opposite surfaces of a prism end. The single wheel and each pair have their axes of rotation disposed along a curvilinear line, parallel to the orbit of rotation of the work-carrier, as indicated at *d*, *e* and *f* (similarly to the grinding elements *a*, *b* and *c*), with the effective surfaces of the wheel in the path of travel of the depending or protruding ends of the prisms clamped in said work-carrier. These ends are successively subjected to the abrading action of the single grinding wheel, and, in sequence, to the action of the peripherally spaced sets of paired grinding wheels, for reducing the curved end of the prism to form an intermediate flat portion, and to progressively convert such flat portion and the abutting curved surfaces into a final curve of a different order.

As shown in Figure 6 of the drawings, the grinding wheel 72 which functions in the first stage of the operation, is keyed to a shaft 73, as at 74, and locked thereon by the usual securing nuts 75 and 76. The two sets of wheels functioning in the second and third stages of the operation, correspond in all details of structure and assembly. Therefore, the description of the grinding wheel assembly of Figure 5 is applicable to both sets of paired wheels.

As will be noted, the mated wheels 77 and 78 have oppositely curved cutting faces, as indicated at 77*a* and 78*a*, and are keyed to the shaft 79, as at 80, and locked against relative longitudinal movement thereon, by the nuts 81 and 82, the wheels being maintained in appropriately spaced relation by the spacer 83. The shaft 73 and the shafts of the two sets of mated wheels are mounted in adjustable bearings in the apparatus frame and are driven similarly to the grinding element shafts of the structure of Figures 1 and 2, as will be hereinafter described.

Figure 7:
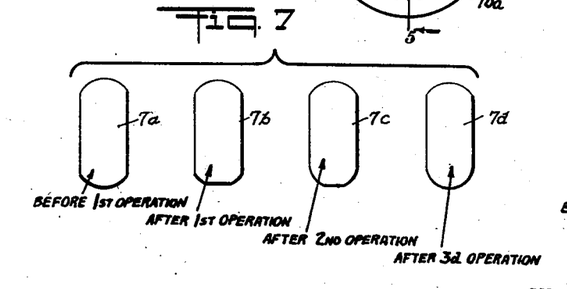
Figure 7 is a view corresponding to Figure 3, illustrating the changes which are produced in the contour of one end, in the progression of the prism through the three grinding zones of the assembly of Figures 4, 5 and 6.
Figure 8:
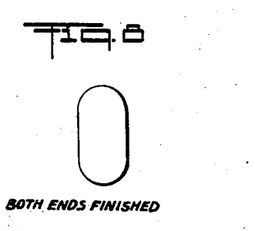
Figure 8 is a diagrammatic view of a prism, both ends of which have been subjected to the end grinding operation.

It will be manifest, that, as the work-carrier rotates, the projecting ends of the prisms clamped to the seats thereof, will first contact with the grinding wheel 72, which will effect a reduction of the rounded end of the prism, shown in view 7a of Figure 7, to produce a flat intermediate portion, as at the bottom of view 7b. As the prism progresses to the paired grinding wheels e, it passes between them for the reduction of the flat surface, to a degree whereby its length is decreased, the merging curved surfaces at either side thereof having a curvature of greater length imparted thereto, as shown at the lower part of view 7c, of said Figure 7, while the passage of the prism between the mated grinding wheels f, completes the profiling of the end of the prism base, to produce a curvature of the order shown at the bottom of view 7d. As the final step in this first phase of the end-grinding and profiling operation is completed, the prisms, continue their progression to that point in the rotative movement of the work-carrier, at which they may be removed from their seats, as heretofore explained. When one end of a prism has been reduced and shaped, the position of the prism may be reversed on its seat, so that the other end thereof may be similarly processed, a plan view of a prism which has passed through both phases of the end-reducing and profiling operation being shown in Figure 8. When both ends of a prism have been processed, it is, of course, removed from the carrier and another substituted, it being obvious that prisms may be removed from the work-carrier and replaced thereon, in reversed position, while it continues to rotate and the grinding elements remain operative upon those prisms which are successively introduced thereto, as described.

Figure 9:
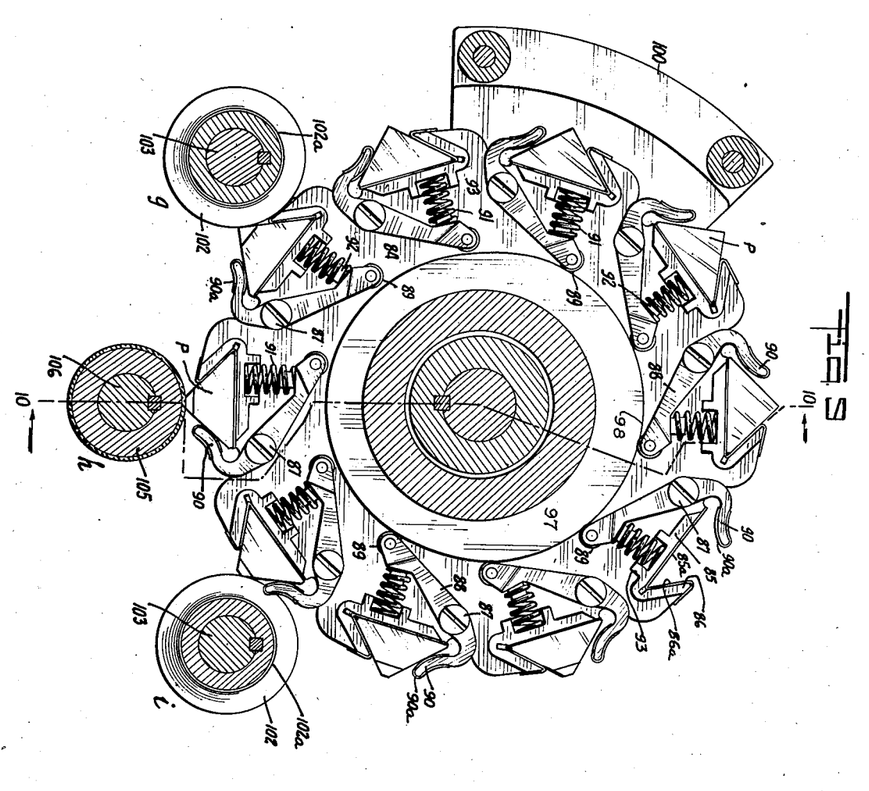
Figure 9 is a view in elevation, partly in section of the rotatable work-carrier and grinding element assembly, which we employ in grinding the prism roof or apex.
Figure 10:
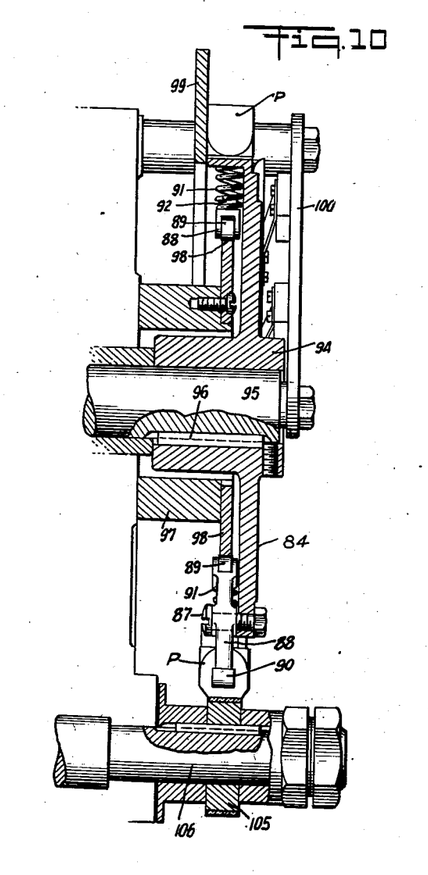
Figure 10 is a vertical cross-sectional view on the line 10—10 of the preceding figure.
Figure 11:
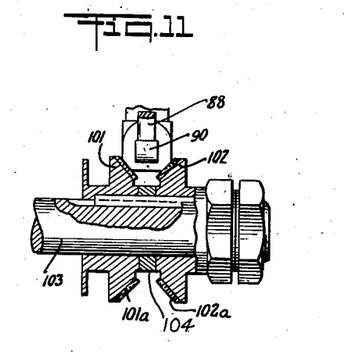
Figure 11 is a transverse sectional view, showing the cooperating or paired grinding wheels for performing the first and third operations in the progression of the work through the roof grinding mechanism assembly of Figure 9.
Figure 13:
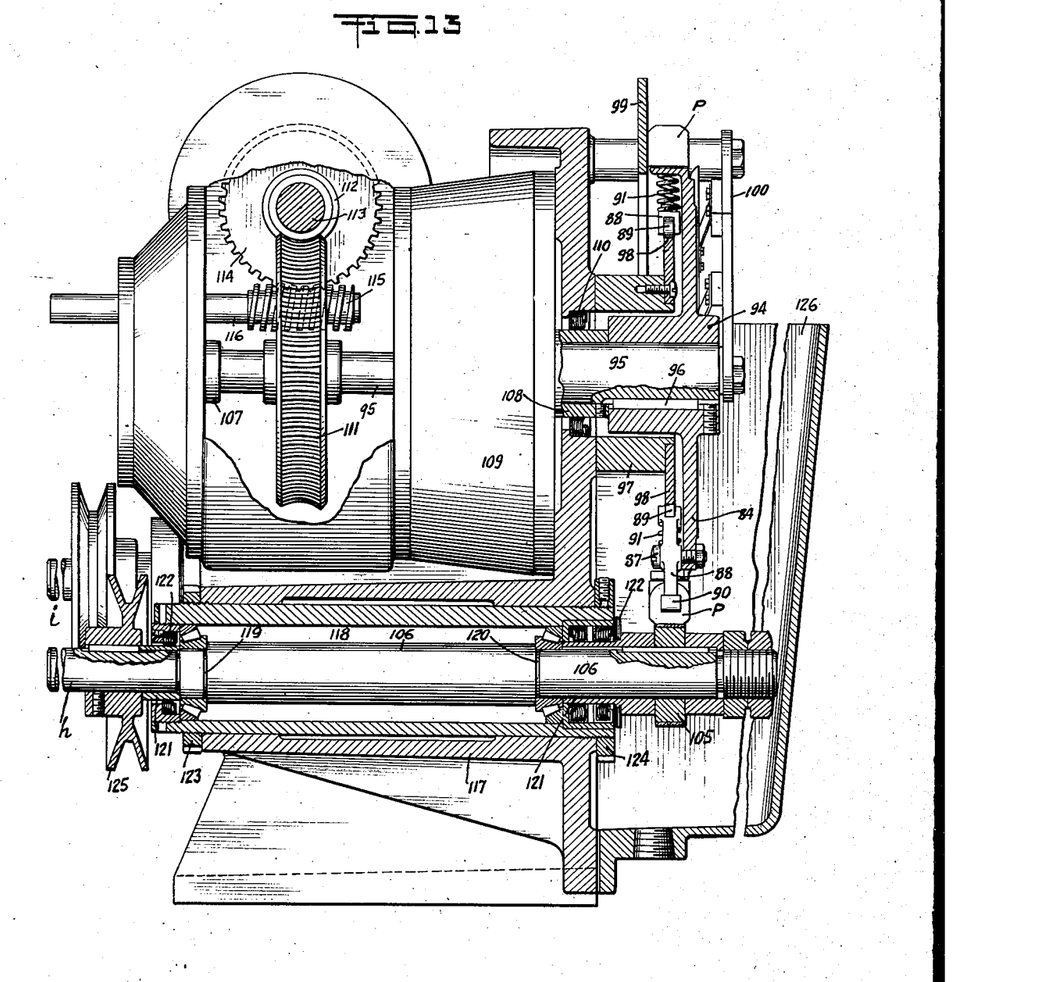
Figure 13 is a vertical transverse sectional view, showing a representative grinding mechanism assembly; and specifically illustrates the roof grinding mechanism assembly as in Figure 10, and the means employed for relatively adjusting the intermediate grinding element and the work-carrier in a vertical plane, to vary the amount of material that is cut away in the second operation of the roof grinding step and likewise compensate for wear of the grinding element.

The mechanism for performing the third and final operation in converting a molded prism into an optical prism, for subsequent polishing, in which the apex of the molded prism is reduced and profiled to produce the optical prism roof, is shown in Figures 9 to 11 inclusive and Figure 13. In this mechanism, the work-carrier comprises a disc-wheel 84, provided with a series of work-receiving seats, arranged in spaced relation along the periphery of said wheel, each seat embodying cooperating fixed work-engaging surfaces 85 and 86. The surface 85 is adapted to receive the base of a prism and, as shown, is slightly shorter than the base of a prism superimposed thereon, and of approximately the same width, while the surface 86 is disposed at an angle to the surface 85, at one end thereof, to conform to the angularity of an end face of such prism, the length of the surface 86 being less than the height of the prism, so that the apex of the prism will project beyond the outer edge of said surface, when the prism base is in registration with the surface 85. While, as shown, the two surfaces are integral, they may be otherwise formed, both of them being, preferably, faced with fibrous or other suitable material, indicated at 85a and 86a, to protect the faces of the prism in contact therewith against damage.

Mounted for rocking movement on a screw 87, adjacent each seat, in proximity to the end of the surface 85 remote from the surface 86, is a lever 88, the inner end of which is bifurcated to provide a mounting for a cam roller 89, while the outer end of said lever is shaped in a reverse curvature to form a prism-engaging surface 90, which, similarly, to the fixed surfaces 85 and 86, is provided with a protective material, as indicated at 90a. An expansion spring 91, interposed between the seat 92 on said lever 88, adjacent the inner end thereof and the seat 93 formed on the inner side of the surface 85, normally functions to urge the prism-engaging end of the lever toward the fixed work-receiving surface 86.

As in the side-reducing and end processing mechanisms, heretofore described, the wheel 84 embodies a hub 94, keyed to the shaft 95, as at 96, the hub being rotatable within the ring or annulus 97, which includes a cam surface 98, corresponding generally to the cam surfaces 34 and 69, its pitch or curvature, however, differing from that of the other cam surfaces in conformity with the lesser number of levers and the disposition of their fulcrum points relatively to the cam surface.

Similarly to the cams 34 and 69, the cam surface 98 is effective to progressively actuate the levers 88 in opposition to their springs 91 and to progressively control their spring-induced movement to prism clamping position, in the manner previously set forth, the prisms being insertable in registration with the seat-defining surfaces 85 and 86, when the levers are inactive, during that part of the rotative movement of the work-carrier, in which their cam rollers are riding upon the intermediate portion or peak 98a of the cam surface.

In locating a prism on the work-carrier, it is inserted in its seat from the outer side thereof, with its base in registration with the surface 85 and one end face associated with the angularly disposed surface 86. Thus, as the opposite end face of the prism is engaged by the portion 90 of the lever 88, the prism is urged into positive contact with the two fixed seat-defining surfaces and locked against relative movement by the clamping action of the lever, the apex of the prism projecting beyond the outer edge of surface 86 and the terminus of the curved prism-engaging portion 90 of said lever, as clearly shown in Figure 9. Inner and outer prism guides, indicated at 99 and 100, cooperate in aligning the prism in its seat, as it passes between them, as set forth in the detailed descriptions of the mechanism of Figures 1 and 2.

Figure 12:
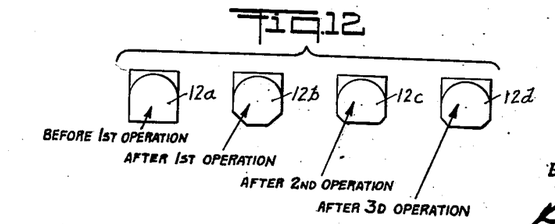
Figure 12 is an assembled view, taken from one end of the prism, showing the dimensional and contour changes that are produced in the operation of the roof grinding mechanism.

As the work-carrier revolves, the prisms of the contour shown in view 12a of Figure 12, are successively introduced to a pair of grinding elements g, which coact to simultaneously bevel the side faces of the prism passing therebetween, adjacent its apex, as shown in view 12b, the prism then progressing to a single grinding wheel, indicated at h, which reduces the sharp apex-defining edge to a flat surface, as illustrated in view 12c, and finally to another pair of coacting grinding elements i, which further reduce the bevelled surfaces produced in the first step of the operation, to attain the ultimate roof profile of the optical prism, as in view 12d of said Figure 12.

The grinding elements g, h and i are mounted below the work-carrier, in the path of travel of the projecting portions of the prisms clamped in the work-receiving seats, similarly to the grinding elements of the mechanisms previously described, the paired grinding wheels 101 and 102, whereby the first step of the operation is performed being fixed to the shaft 103, with a suitable spacer 104 interposed therebetween, as shown in Figure 11. The mated grinding wheels for performing the third and final step of the operation, indicated at i in Figure 9, correspond to the wheels 101 and 102, the wheels of both sets having opposed bevelled surfaces 101a and 102a, between which the protruding portions of the prisms pass in the initial bevelling step and in the final reducing step of this operation. The single grinding wheel 105, which functions in the intermediate step of the roof-forming operation, indicated at h in Figure 9, to reduce the apex to a flat surface, is rotatable with the shaft 106 and otherwise corresponds to the grinding wheel 72, employed in the end-reducing and profiling mechanism.

The mountings for the work-carrier shafts 17, 65 and 95, of the respective mechanisms, in the machine frame, correspond one with the other, as do the driving means for these shafts; also the shaft of each of the several grinding elements, whether of the single or double type, is vertically adjustable, as heretofore stated, so that the grinding element carried thereby may be raised toward the work-carrier, with which it is associated, to compensate for wear in the abrading surface thereof. Therefore, the description of the mounting of the shaft 95 of Figure 13, together with its driving means, will be understood to apply also to shafts 17 and 65 of the side-forming and end-reducing and profiling mechanisms, while the description of the assembly of the grinding element shaft 106, including the means for effecting vertical adjustment thereof, relatively to the apparatus bearing in which it is mounted, will similarly apply to all three grinding element shafts of each of the mechanisms.

The work-carrier shaft 95, as will be noted from Figure 13, is journaled in suitable bearings 107 and 108 in the frame of the apparatus generally indicated at 109, suitable packing means 110 being associated with the outer bearing 108, as shown. Keyed to said shaft 95, between the bearings 107 and 108, is a worm gear 111, in mesh with a worm 112 fixed to the cross shaft 113, the latter shaft carrying a worm gear 114 meshing with a worm 115 on the drive shaft 116, suitably mounted in the frame of the apparatus and driven in any appropriate manner, the gearing ratio being such that the shaft 95 will revolve at slow speed, as for example, eight or ten revolutions per minute. Obviously, the shafts of the several mechanisms may be otherwise mounted and other means than described may be utilized for effecting rotative movement of the respective work-carriers. However, a worm gear drive of the type shown gives the desired speed reduction and insures a continuous steady rotative movement of the work-carrier, possible back-lash that might occur with other types of gear trains being eliminated.

For mounting the grinding element shaft assembly, a bearing 117 extends transversely of the apparatus frame below and parallel to the shaft bearings 107 and 108, the inner face of this bearing being complemental to the periphery of the eccentric sleeve 118 insertable therein, in which the grinding element shaft 106 is concentrically mounted, in the roller bearings 119 and 120, adjacent the respective ends of said sleeve, in association with the usual retainers 121 and packing rings 122, the eccentric sleeve being positively locked in the bearing 117 by the locking rings 123 and 124 in engagement with each end thereof. As will be evident, the shaft 106 and the grinding wheel 105 keyed thereto may be raised in the vertical plane of the work-carrier by manipulating the aforesaid locking rings to permit of the rotation of the eccentric sleeve within the bearing 117 to reverse its position from that in which it is shown in Figure 13, the locking rings being then functioned to positively maintain it in such adjusted position.

At its outer end the shaft 106 has keyed thereto a grooved pulley 125, whereby the shaft may be driven through the medium of a belt traversing the same, from a cooperating pulley on the drive shaft 116 or from some other point of the apparatus.

A trough 126 is secured to the side of the apparatus and serves to contain the lubricant, preferably water, within which the grinding elements perform their functions, the level of such lubricant being such as to provide for the continuous lubrication of the grinding elements operable in the respective stages as the work is continuously moved in its path; the aforesaid liquid serving, in addition to its lubricating function in relation to the grinding elements, as a coolant for the moving members of the mechanism and the prisms beig treated.

While we have described the embodiment of our invention as herein shown, in more or less detail, it will be manifest that the various changes may be effected in the structure of the different components, to meet specific requirements of production and use. For instance, the work-carriers functioning in the different operations may vary in design from those shown and described and the method of mounting the grinding elements and providing for their adjustment relatively to the work clamped to the work-carrier may differ, all of these and such other changes of structural details as may be essential to the practical application of our invention, coming within the spirit and scope of this disclosure, which is broadly directed to the attainment of the objectives hereinbefore set forth by the method described and apparatus for rendering such method effective.

We claim:

1. A work-carrier for apparatus for grinding optical prisms, having circumferentially spaced fixed prism-receiving seats, each seat embodying surfaces conformed to receive a prism applied thereto only in a pre-arranged position, to permit portions of the prism to project beyond the seat, yieldable means associated with each seat adapted to frictionally engage a surface of the prism to retain it in position within said seat, a lever pivotally connected to said carrier adjacent each of said seats formed for engaging prism surface, spring means for urging said lever into engagement with the opposed prism surface to exert clamping effort thereon counter to said friction means, for locking the prism within the seat, and a roller carried by said lever, whereby said lever may be actuated in opposition to said spring to release the work for removal from its seat.

2. An apparatus for grinding optical prisms, including a rotatable prism-carrier provided with circumferentially spaced fixed seats, each embodying surfaces conformed to mate with opposite flat surfaces of a prism disposed thereon and defining the sole position, in which a prism may be located on a seat to dispose portions thereof to project beyond the area of said seat, clamping means associated with each of said seats for locking the prism therein, means for rotating said carrier in a vertical plane, a series of grinding elements mounted for rotation in the plane of said work-carrier, in peripherally spaced relation to each other in the path of travel of the projecting portions of the prisms seated on said carrier, whereby the rotation of said carrier will simultaneously expose the projecting portions of a plurality of prisms to the action of said elements, to progressively reduce the projecting portions of consecutive prisms in a predetermined amount, means fixed with relation to said carrier embodying a cam surface conformed for engagement by said clamping means to progressively urge said clamping means into clamping engagement with successive prisms, following their location in said seats and on completion of said reduction operation to sequentially operate said clamping means to release the prisms for removal from their respective seats, and eccentric means rotatable for effecting adjustments of said grinding elements relative to said carrier in their common plane of rotation.

3. An apparatus for grinding optical prisms, including a rotatable work-carrier provided with relatively annularly spaced work-receiving seats, each being adapted to receive a prism in a prearranged position, the width of the seat being less than the width of the prism, whereby the sides of the latter will project beyond the seat, means for clamping the prisms in their respective seats, operative sequentially in a predetermined part of a cycle of said carrier, a series of sets of paired grinding elements rotatable on axes parallel to the axis of rotation of said carrier, the respective sets of elements being peripherally spaced relatively to each other with the effective surfaces of the elements of each pair disposed in the path of travel of the side portions of the prisms projecting laterally of the carrier seats, whereby the rotative movement of the carrier will sequentially introduce the prisms to the successive sets of grinding elements for progressively reducing the projecting side portions of the prisms to a predetermined degree, the opposite sides of each prism being simultaneously reduced in the same amount, by the paired grinding elements of each set of the series.

4. An apparatus for grinding optical prisms, including a rotatable work-carrier provided with relatively annularly spaced seats, each being adapted to receive a prism, disposable thereon in a position whereby one end of the prism will protrude beyond said seat, means for clamping the prisms in their respective seats operable sequentially in a predetermined rotative movement of the carrier, a series of grinding elements rotatable on axes parallel to the axis of rotation of said carrier, said series including single grinding element and two sets of paired grinding elements, the elements of each of the two latter sets having their effective surfaces laterally spaced and of a similar contour, all of said elements being disposed in the path of travel of the projecting end portions of the prisms seated on said carrier, whereby the rotative movement of said carrier will successively introduce the respective prisms to said single grinding element and in sequence to each pair of elements, said single element acting to reduce the end portion, the paired grinding elements acting upon the reduced end to progressively change the contour thereof.

5. An apparatus for grinding optical prisms, including a rotatable work-carrier provided with relatively annularly spaced seats, each being formed for the reception of a prism centered thereon to project the apex of the prism beyond the seat, the base of the prism being disposed toward the axis of the carrier, means for clamping the prisms in their respective seats, said means becoming sequentially effective during a predetermined degree of rotative movement of said carrier, a series of grinding elements rotatable on axes parallel to the axis of rotation of said carrier, said series including a single grinding element and two sets of paired grinding elements, the elements of each of the two latter sets having their effective surfaces laterally spaced, all of said elements being disposed in the path of travel of the projecting apex of the prisms seated on said carrier, the rotative movement of the carrier successively introducing the prisms to a set of paired elements, then to the single element and finally to the remaining set of paired elements, the first operation simultaneously bevelling the corners of the apex, the second reducing the height of the prism and the third reducing the bevelled surfaces produced in the first operation.

6. A method of processing a molded glass triangular prism in its conversion into an optical prism in a series of co-related automatically performed operations, which consists in simultaneously subjecting both sides of the prism to progressive reduction in the desired amount in a single continuing operation, then reducing one end of the prism and subjecting it to contour shaping in successive stages, in which opposite and connecting surfaces are simultaneously and progressively reduced to obtain the final end contour, in a second continuing operation, similarly reducing and profiling the other end of the prism in a corresponding second step of the end grinding operation and then successively bevelling the corners of the prism apex, reducing the apex to form the optical prism roof and reducing the bevelled corner-forming surfaces to attain the ultimate roof profile in the final continuing operation of the series.

7. A method of converting a plurality of molded glass triangular prisms of corresponding dimensions into identical optical prisms, in a series of co-related continuing mechanical operations, which consists in successively introducing the prisms in a uniform arrangement to grinding elements for effecting the simultaneous reduction of the sides of each prism, as they are presented to such elements, in the first of such continuing operations, then successively introducing the same prisms in a second and different uniform arrangement to other grinding elements for reducing one end of the prism and importing a prescribed contour thereto, in a second continuing operation, reversing the arrangement of the prisms and successively subjecting them to reducing and profiling grinding in a second continuing phase of the end-forming operation and then successively introducing the prisms in a third and further uniform arrangement to additional grinding elements for bevelling the corners of the apex of each prism and successively reducing such apex to form the optical prism roof and reducing the bevelled corner surfaces to attain the ultimate roof profile in a final continuing operation.

8. A rotatable work-carrier adapted to transport a plurality of glass prisms through a zone for reduction by contact with grinding elements, in a continuing cycle of movement, said work-carrier having fixed surfaces relatively disposed for locating the prisms in contact therewith in a predetermined uniform position, spring-actuated work-engaging means adapted to cooperate with said fixed surfaces, in a clamping action, to hold the prisms immovable relatively to said work-carrier, during their passage through said zone, and fixed means associated with said work-carrier, comprising a cam element having a continuous curved peripheral surface, the radius of which varies gradually without abrupt change between a minimum and a maximum, said work-engaging means during a part of the cycle of movement of said work carrier being engageable by said peripheral cam surface for progressively displacing the former in gradually increasing composition to the springs thereof from work-clamping to work-releasing position, the engagement of the work-engaging means by the peripheral cam surface in opposition to the springs of the former being progressively decreased and the former being displaced from work-releasing to work-clamping position during a succeeding part of the cycle of movement of said work carrier.

9. An apparatus for grinding optical prisms, including a rotatable work-carrier provided with circumferentially spaced fixed prism seats, each embodying surfaces conformed to mate with the base and one end wall of a prism, the width of the seat being less than the width of the prism, whereby the sides of the latter will project outwardly of the seat, means for clamping the prisms in their respective seat, each of said clamping means embodying a portion conformed to engage the end wall of the prism opposite to that in fixed engagement with the seat surface, a fixed cam engageable by said clamping means for actuating said clamping means in sequence to clamp each prism in its seat, during a predetermined part of the cycle of said carrier, in a progressively increasing pressure-exerting movement of the portion of said clamping means engageable with the opposed prism end, a series of relatively spaced sets of paired grinding elements rotatable on axes parallel to the axis of rotation of said carrier disposed for the passage of the prisms therebetween with their opposite projecting sides abradingly engaged by each pair of elements, whereby in a continuing cycle of movement of said carrier consecutive prisms will be successively introduced to each set of grinding elements for progressively reducing the projecting sides of each prism to produce an ultimate prism of a predetermined width, the spacing of said sets of grinding elements relative to the circumferential spacing of the prism seats providing for the simultaneous reduction of the sides of a plurality of prisms in traversing engagement with the effective surfaces of the spaced sets of grinding elements.

10. An apparatus for grinding optical prisms, including a rotatable work-carrier provided with circumferentially spaced fixed prism seats, each seat embodying surfaces conformed to mate with one end wall and a portion of the opposite end wall of a prism in engagement with the apex thereof, to dispose one end of the prism beyond the periphery of said work-carrier, means for clamping the prisms in their respective seats, each of said clamping means including a portion conformed to engage the base of the seated prism, a fixed cam surface engageable by said clamping means for actuating said clamping means in sequence to clamp each prism in its seat, during a predetermined part of the cycle of said carrier, in a progressively increasing pressure-exerting movement of the portion of the clamping means engageable with the opposed prism base, a series of relatively spaced grinding elements, certain of said elements being paired, all of said elements being rotatable on axes parallel to the axis of rotation of said work-carrier and being disposed relative to the periphery of said work-carrier for engagement by the projecting ends of the prisms seated thereon, whereby in a continuing cycle of movement of said carrier consecutive prisms will be successively introduced to said grinding elements for progressively reducing the projecting end of each prism to produce an ultimate predetermined end contour, the spacing of said grinding elements relative to the circumferential spacing of the prism seats permitting of the simultaneous reduction of the ends of a plurality of prisms in traversing engagement with the effective surfaces of the relatively spaced grinding elements.

11. An apparatus for grinding optical prisms, including a rotatable work-carrier provided with circumferentially spaced prism seats, each embodying surfaces conformed to mate with the base of a prism and a portion of one end wall thereof and cooperate to locate the apex of a prism entered in said seat outwardly of the periphery of said work-carrier, means for clamping the prisms in their respective seats, each of said clamping means including a portion shaped to engage with a major portion of the end wall of the prism opposite to the end wall thereof engaged with said seat surface, a fixed cam having a surface engageable by said clamping means for actuating said clamping means in sequence to clamp each prism in its seat, during a predetermined part of the cycle of said carrier, in a progressively increasing pressure-exerting movement of the prism wall-engaging portion of said clamping means with the opposed prism wall, a series of relatively spaced grinding elements mounted for rotation on axes parallel to the axis of rotation of said work-carrier and disposed relative to the periphery of said carrier for engagement by the projecting apices of the prisms clamped in the seats thereof, certain of said elements being paired, whereby in a continuing cycle of movement of said work-carrier consecutive prisms will be successively introduced to said grinding elements for progressively reducing the projecting apex-forming surfaces of the prisms to produce a prism roof of a predetermined area and contour, the spacing of said grinding elements relative to the circumferential spacing of the prism seats permitting of the simultaneous reduction of the apex-forming surfaces of a plurality of prisms in traversing engagement with the effective surfaces of the relatively spaced grinding elements.

12. An apparatus for grinding optical prisms, comprising a rotatable work-carrier adapted to transport in a continuous cycle of movement a plurality of optical prisms from a first zone, in which unground prisms are fed to the work-carrier, through a zone for reduction by contact with grinding elements and back to the first zone for removal of the ground prisms, said work-carrier having fixed surfaces peripherally disposed for mounting the prisms in predetermined spaced positions, spring-actuated work-engaging means associated with said work-carrier for movement therewith and adapted, in a clamping action, to cooperate with said fixed surfaces, for maintaining the prisms immovable during their passage through said reduction zone, and a fixed cam element associated with said work-carrier having a continuous curved peripheral surface the radius of which varies progressively and without abrupt change, from a minimum in correspondence to said reduction zone to a maximum in correspondence to said first zone, said work-engaging means being engageable by said peripheral cam surface during the travel of these former from said reduction zone to said first zone, to gradually displace said work-engaging means in progressively increasing opposition to the springs thereof from work-clamping to work-releasing position, the displacing engagement of the work-engaging means by the peripheral cam surface in opposition to the springs of the former being progressively decreased during the travel of said work-engaging means from the first zone to the reduction zone, whereby the work-clamping pressure of the springs thereof is correspondingly gradually increased to actuate the work-engaging means to firmly maintain the prisms in position for grinding in said reduction zone.

GEORGE KENDE.
ELI ELISON.
STEN JOHANSON.